Sept. 1, 1931.　　　　G. O. HARM　　　　1,820,910
CEMENT CHARGER
Filed July 20, 1929　　　3 Sheets-Sheet 1

INVENTOR
GEORGE O. HARM.
By
Evans & McCoy
ATTORNEYS.

Sept. 1, 1931.   G. O. HARM   1,820,910
CEMENT CHARGER
Filed July 20, 1929   3 Sheets-Sheet 2
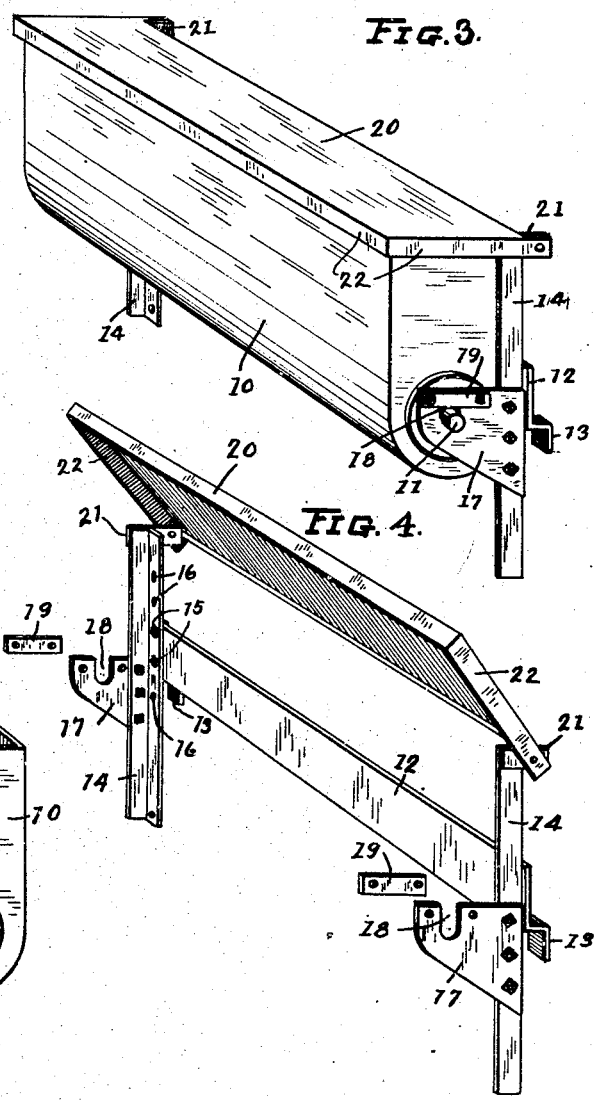
INVENTOR
GEORGE O. HARM.
BY
Evans & McCoy
ATTORNEYS.

Sept. 1, 1931.  G. O. HARM  1,820,910
CEMENT CHARGER
Filed July 20, 1929  3 Sheets-Sheet 3

INVENTOR
GEORGE O. HARM.
BY
Evans & McCoy
ATTORNEYS.

Patented Sept. 1, 1931

1,820,910

UNITED STATES PATENT OFFICE

GEORGE O. HARM, OF WARREN, OHIO

CEMENT CHARGER

Application filed July 20, 1929. Serial No. 379,607.

This invention relates to dumping trucks such as are employed for delivering batches of material to a concrete mixer and more particularly to means in connection with such a truck for separately storing the mixture of coarse and fine aggregates and the cement for a concrete batch and for discharging the cement into the aggregates as they are being discharged from the truck body.

Heretofore mixer charging dump trucks have been provided with gate controlled receptacles for storing the cement separately from the sand and gravel or other aggregates, but in all such devices of which I am aware, difficulty has been experienced in preventing the passage of moisture from the sand and gravel into the cement in the receptacle and in preventing leakage of cement from its container prior to dumping due to the exceeding fineness of the cement and due to the difficulty of keeping the discharge gate closed tightly enough to prevent leakage of cement from the receptacle and the absorption of moisture by the cement.

The present invention has for an important object to provide a cement receptacle which protects the cement from the moisture in the loose material surrounding the receptacle, which prevents leakage of cement into the sand and gravel or other aggregates during transportation, and which discharges the dry cement into the stream of aggregates flowing from the truck body as the contents of the truck are being dumped into the skip of the cement mixer.

More specifically, the object of the present invention is to provide a cement receptacle which is open at its top only and which is pivotally mounted to swing to an inverted position to dump the cement into the sand and gravel or other aggregates flowing from the truck body during the dumping operation.

A further object is to provide a cement handling unit which is adapted to be mounted upon an ordinary dumping truck and which comprises a supporting frame constructed to rest upon and be held in upright position on a wall of the truck body in carrying a tilting receptacle for the dry cement which is held in upright position during transportation and which is adapted to automatically swing by gravity to discharge position during the dumping operation.

A further object is to provide a tilting receptacle for cement which is pivotally mounted on eccentric trunnions which are so disposed with respect to the center of gravity and longitudinal center plane of the receptacle that the receptacle will be automatically held by gravity in upright position when the truck body is not hoisted and will tend to swing by gravity to dumping position when the truck body is tilted so that the filling of the receptacle with cement and the mixing of the cement with the sand and gravel or other aggregates is facilitated.

A further object is to so mount the tilting receptacle in the truck body that the sand and gravel or other aggregates with which the truck body is filled will engage the lower portion of the tilting receptacle and retard the tilting movement of the receptacle at the beginning of the dumping operation.

Another object is to so mount a tilting receptacle in each compartment of a truck body that the sand and gravel or other aggregates with which each compartment is filled will retard the tilting movement of some of the receptacles in their compartments while another compartment is dumping.

With the above and other objects in view, the invention may be said to comprise the apparatus as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Figure 1 is a side elevation of a dumping truck embodying the invention. The dotted lines indicate the associated receptacles and gates in their relative positions when the truck body is dumping.

Fig. 2 is a longitudinal section through the truck body in dumping position, with one of the discharge gates open, and a cement receptacle in dumping position. The lid of one receptacle is shown open in dotted lines to illustrate how the material held in one compartment will support the receptacle against dumping even though the truck body is in dumping position to release the material in another compartment.

Fig. 3 is a perspective view showing a cement receptacle mounted on its supporting frame.

Fig. 4 is a perspective view of a supporting frame with the cement receptacle removed.

Fig. 5 is a perspective view of the cement receptacle detached from its frame.

Figure 1:
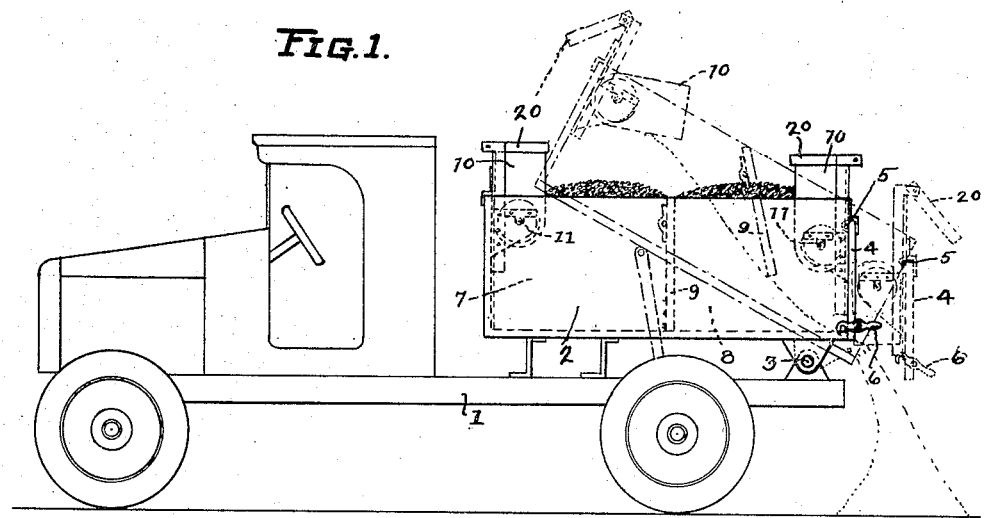

In the accompanying drawings, the invention is illustrated as applied to an ordinary dumping truck indicated by reference numeral 1 in Fig. 1, the truck being provided with the usual tilting body 2 which is mounted to swing about a transverse pivot 3 connecting the rear end portion of the body to the rear end portion of the truck frame. The tilting body 2 is provided with the usual pivoted tail gate 4 which is mounted to swing about a pivot 5 adjacent the top edge of the gate and which is held in closed position by means of a suitable manually operable latch 6.

Figure 2:
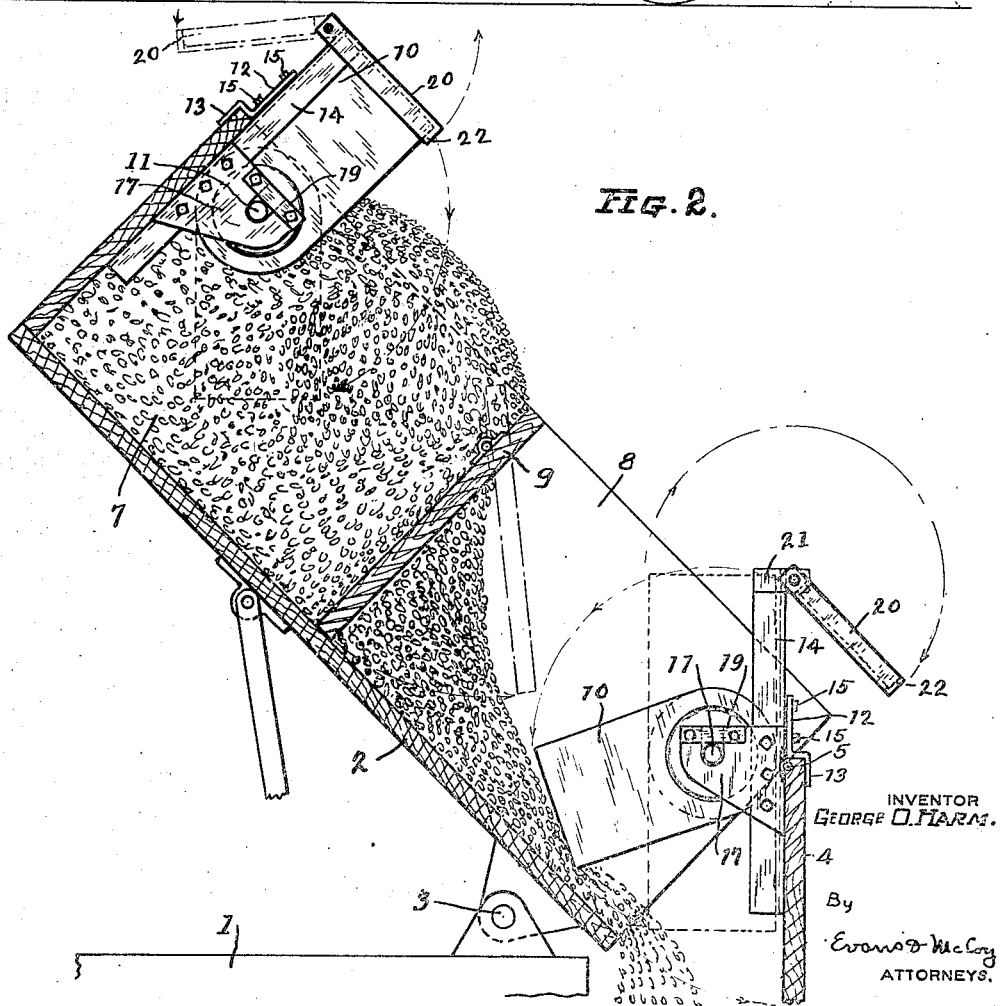

As shown in Figs. 1 and 2, the truck body 2 is divided into two compartments 7 and 8 by means of an intermediate pivoted gate 9 which is latched in closed position by suitable means (not shown) and which may be released after the rear compartment has been emptied to discharge the material from the front compartment.

Each of the compartments 7 and 8 of the truck body is of a size to hold the amount of sand and gravel required by the cement mixer for one batch of concrete and, in each of the two compartments, there is mounted a tilting cement receptacle 10 which is pivotally supported on trunnions 11 carried by the receptacle below its center of gravity. Each of the cement receptacles is mounted upon a suitable supporting frame which is removably supported upon an end wall of one of the compartments, the end wall supporting the receptacle in the rear compartment being preferably the tail gate which forms the rear wall of this compartment and the supporting frame for the receptacle in the forward compartment being mounted preferably upon the front end wall of the truck body.

The supporting frames for both receptacles are identical and interchangeable, each having a transverse supporting bar 12 which has integral flanges 13 adjacent opposite ends thereof which serve as supporting clips and fit over the top and outer side of the wall upon which the frame is supported. Vertical standards 14 are rigidly attached to the supporting bar 12 adjacent the opposite ends thereof by means of bolts 15 which may pass through any one of a series of vertically spaced apertures 16 in the standards, a row of apertures 16 being provided in each of the standards so that the cross bar may be adjusted vertically on the standards. Each of the standards 14 has attached thereto a bearing bracket 17 which projects to the side of the standards opposite that to which the supporting bar 12 is attached. Bearing brackets 17 are horizontally alined and are provided with open top bearing slots 18 which have rounded bottoms to receive the trunnions 11 of the cement receptacle, the trunnions being retained in the slots 18 by means of retaining bars 19 which are bolted across the upper ends of the slots after the trunnions are in place therein.

As shown in Figs. 1 and 2 of the drawings, the brackets 17 are supported preferably below the top of the side walls of the truck body so that, when the compartments of the truck body are filled with sand and gravel, the bottom portion of each of the cement receptacles is embedded in the sand and gravel so that the receptacle is firmly held in upright position. The open top of the cement receptacle is covered during transportation by a lid 20 which is hinged to brackets 21 attached to the upper ends of the standards 14 and this lid is provided with marginal flanges 22 which engage with the side walls of the receptacle. The lid, when closed, serves to releasably hold the cement receptacle in upright position so that the receptacle will not tilt until the lid has been released. The receptacle may thus be positively prevented from tilting during transportion and released prior to the dumping operation. If desired, the lid on the cement receptacle of the forward compartment may remain closed, holding this cement receptacle against tilting movement until after the rear compartment has been emptied.

In order to facilitate the filling of the cement receptacle prior to the filling of the compartments with sand and gravel, the trunnions 11 are mounted slightly to one side of the central longitudinal plane of the receptacle away from the standards so that the receptacle will be held by gravity in upright position against the standards when the truck body is level especially if the compartments are empty. The cement receptacles may thus be swung to vertical position and may be filled with cement before the sand and gravel is delivered into the compartment.

As shown in Fig. 5 of the drawings, suitable transverse reinforcing plates 23 may be provided within the receptacle to stiffen the same and prevent spreading of the side walls by the weight of the cement in the receptacle.

Each of the cement handling units comprising the supporting frame and tilting cement receptacle may be put in place on the truck body by merely lowering the standards along the inner face of an end wall until the flanges 13 of the supporting bar 12 engage the top of the wall and, when it is desired to use the truck for other purposes, the cement handling units can be removed simply by lifting them bodily out of the truck body. The adjustable connection between the standards 14 and supporting bar 12 serve to position the receptacle at the proper height above the floor of the truck, so that the cement handling units can be mounted in trucks of various makes and, where the unit is mounted upon a tail gate, the receptacle may be supported at a sufficient height to permit the open end thereof to swing clear of the floor of the truck during the dumping operation.

Figure 6:
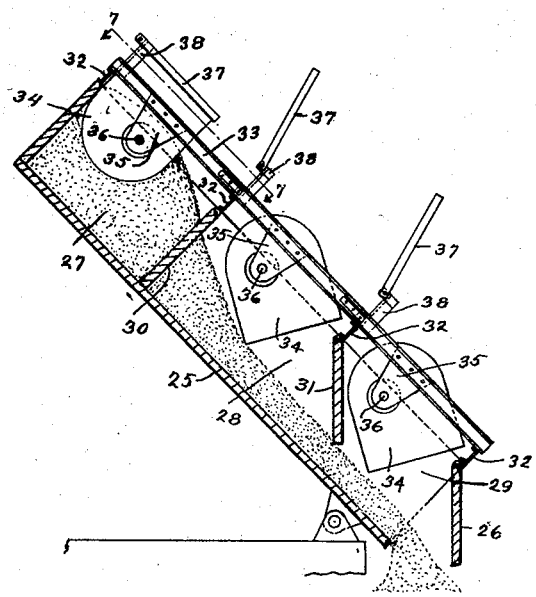
Fig. 6 is a longitudinal section through a three compartment truck body with a slightly modified form of cement receptacle in each compartment.
Figure 7:
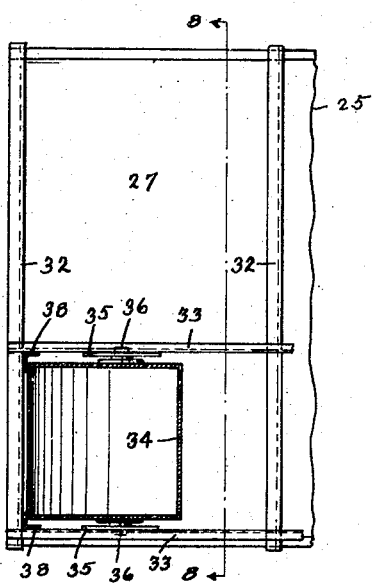
Fig. 7 is a section taken on the line indicated at 7—7 in Fig. 6.
Figure 8:
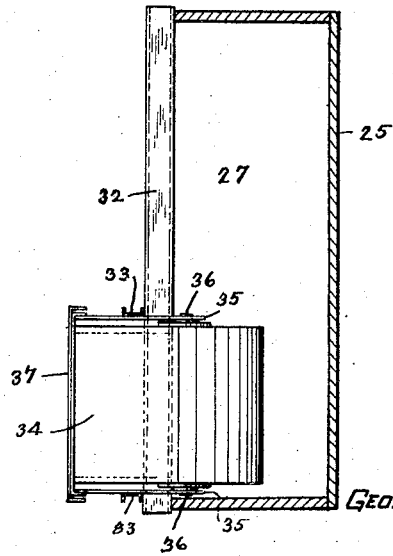
Fig. 8 is a section taken on the line indicated at 8—8 in Fig. 7.

In Figs. 6, 7 and 8 of the drawings, there is shown a modification of the invention suitable for application to a three compartment truck body 25 which is provided with a tail gate 26 and is divided into compartments 27, 28 and 29 by intermediate pivoted gates 30 and 31.

In this modification, the cement receptacles are supported upon a frame which is mounted upon the top of the truck body, this frame including cross bars 32 which extend across the truck body at the ends thereof and over each of the intermediate discharge gates.

Adjacent one side of the truck, the cross bars 32 are connected by longitudinal bars 33 which extend the full length of the truck body, one of the bars 33 being positioned over one side of the wall of the truck body and the other longitudinal bar being spaced inwardly a sufficient distance to accommodate between the bars a cement holding receptacle 34 which is supported on bearing brackets 35 depending from the longitudinal bars 33 within each of the three compartments, the receptacle 34 being provided with trunnions 36 which are positioned below the center of gravity of the receptacles rearwardly of the transverse center plane of the receptacles.

Each of the receptacles is provided with a lid 37 which is preferably hinged to standards 38 attached to the cross bars 32 adjacent each of the receptacles. The eccentric mounting of the trunnions of each of the receptacles causes the center of gravity of the receptacle to be positioned between the trunnions and the cross bar 32 immediately to the rear of the receptacle so that the receptacle will be retained by gravity in upright position when the truck body is leveled. The bearing brackets 35 are positioned a sufficient distance in advance of the cross bars 32 to permit the bottoms of the receptacles to swing past the bars as the receptacles are tilted about their trunnions and, when the truck body is tilted to dumping position, as shown in Fig. 6, the centers of gravity of the receptacles will be so shifted that the receptacles, when the lids are opened, will swing by gravity to their inverted dumping positions.

It will be apparent that the present invention, by providing a cement receptacle which may be made in one piece with an opening in the top only, provides perfect protection for the cement in the receptacle during transportation, thereby eliminating many of the difficulties which have been heretofore experienced in the transportation of concrete batches.

Furthermore, the present invention provides a cement handling attachment for dumping trucks which is of simple and inexpensive construction, which can be applied to or removed from an ordinary truck body with a minimum of labor and which is very convenient in operation.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. The combination with a tilting truck body having a discharge gate, of a supporting frame mounted on said body, a receptacle having an opening at the top thereof, trunnions below its center of gravity journaled in said frame within the side walls of the truck body and at a height over the floor of the body greater than the distance from the trunnions to the top of the receptacle, and a lid pivoted to said frame and engageable with the top of said receptacle to releasably hold the same in upright position.

2. The combination with a tilting truck body having a swinging discharge gate, of a frame attached to the inner side of the gate and projecting above the top thereof, a receptacle pivoted below its center of gravity to said frame and having an open top, said receptacle being mounted at a height above the floor of the truck body sufficient to permit the open top of the receptacle to swing past said floor to inverted position when the truck body is tilted to discharge its load, and a lid hinged to said frame and engageable with the open top of the receptacle to releasably hold the receptacle in upright position.

3. The combination with a tilting truck body having a swinging discharge gate, of a frame attached to the inner side of the gate and projecting above the top thereof, laterally spaced horizontally alined bearing members carried by said frame, a receptacle having an open top and provided with trunnions below its center of gravity journaled in said bearings, and releasable means for retaining the receptacle in upright position.

4. The combination with a tilting truck body having a swinging discharge gate, of a frame attached to the inner side of the gate and projecting above the top thereof, said frame being mounted for vertical adjustment on said gate, laterally spaced horizontally alined bearing members carried by said frame, a receptacle having an open top and provided with trunnions below its center of gravity journaled in said bearings, and releasable means for retaining the receptacle in upright position.

5. The combination with a tilting truck body having a swinging discharge gate, of a frame attached to the inner side of the gate and projecting above the top thereof, laterally spaced horizontally alined bearing members carried by same frame, a receptacle having an open top and provided with trunnions below its center of gravity journaled in said bearings, and a flanged lid hinged to the upper end of said frame, and engaging the top of said receptacle to releasably hold the same in upright position.

6. In a cement charging truck, a tilting body having a plurality of compartments, each controlled by a discharge gate and each being of a capacity to receive a charge of aggregates for a batch of concrete, and a container mounted within each compartment to swing about an axis below its center of gravity and having an opening at the top thereof, said container being of a capacity to receive the amount of cement required for the charge of aggregates in the compartment and supported below the top of the compartment whereby it will be held in upright position by the aggregates in the compartment and will swing by gravity toward inverted position and discharge into the aggregates its contents as the aggregates flow from the compartment.

7. In a cement charging truck, a tilting body having a discharge gate and adapted to receive a charge of aggregates for a batch of concrete, and a cement receptacle having a discharge opening at the top thereof and pivoted below its center of gravity within the body, said receptacle being pivoted a sufficient distance above the floor to permit the receptacle to swing substantially to inverted position during the dumping operation to discharge its contents into the material flowing from the body, said receptacle being pivoted below the tops of the side walls of the body so that the material contained in the truck body holds the receptacle against turning movement toward inverted position and impedes the turning movement of the receptacle during the dumping operation, to cause distribution of the cement over the flowing mass of aggregates.

8. In a cement charging truck, a tilting body adapted to receive a charge of aggregates for a batch of concrete and having a discharge gate pivoted to swing rearwardly about an axis adjacent its upper edge, and a cement receptacle mounted on the gate, said receptacle having a discharge opening at the top thereof and pivoted below its center of gravity within the body, said receptacle being pivoted a sufficient distance above the floor to permit the receptacle to swing substantially to inverted position during the dumping operation to discharge its contents into the material flowing from the body, said receptacle being pivoted below the tops of the side walls of the body so that the material contained in the truck body holds the receptacle against turning movement toward inverted position and impedes the turning movement of the receptacle during the dumping operation to cause distribution of the cement over the flowing mass of aggregates.

9. In an apparatus of the class described, a tilting truck body, a frame supported on the body, laterally spaced bearing members carried by said frame, a receptacle having an open top and provided with trunnions below its center of gravity journaled in said bearings, and releasable means for retaining the receptacle in upright position, the turning axis of the receptacle and trunnions being offset from the central longitudinal plane of the receptacle whereby the receptacle will be held in upright position against the frame when said releasable means is released.

10. In an apparatus of the class described, a tilting truck body, a frame supported on the body, laterally spaced bearing members carried by said frame, and a receptacle having an open top and provided with trunnions below its center of gravity journaled in said bearings, the turning axis of the receptacle and trunnions being offset from the central longitudinal plane of the receptacle whereby the receptacle will be held in upright position against the frame.

11. A tilting charging receptacle, a supporting frame therefor, said receptacle having an open top and provided with trunnions below its center of gravity, and journaled in said frame, whereby said receptacle may be dumped upon tilting of the frame out of its normal position, the turning axis of the receptacle and trunnions being offset from the central longitudinal plane of the receptacle whereby the receptacle will be held in upright position against the frame when the frame is in substantially normal position.

In testimony whereof I affix my signature.

GEORGE O. HARM.